(No Model.)

J. G. EBERHARD.
HARNESS TRIMMINGS OF GLASS OR EARTHENWARE.

No. 301,104. Patented July 1, 1884.

Attest
Charles F Day
George S Robinson

Inventor
John G. Eberhard
by Bradford Howland
his Attorney.

UNITED STATES PATENT OFFICE.

JOHN G. EBERHARD, OF AKRON, OHIO.

HARNESS-TRIMMINGS OF GLASS OR EARTHENWARE.

SPECIFICATION forming part of Letters Patent No. 301,104, dated July 1, 1884.

Application filed February 18, 1884. (No model.)

*To all whom it may concern:*

Be it known that I, JOHN G. EBERHARD, a citizen of the United States, residing at Akron, Summit county, Ohio, have invented a new and useful Improvement in Articles of Glass and Earthenware adapted for Harness-Trimmings, of which the following is a specification.

My invention relates to glass and china articles in the form of rings, diamonds, links, and other forms suitable for ornament and use in harness mountings and trimmings, and other purposes; and it consists in forming them with a groove to receive a band for the purpose of strengthening them, and by means of which they may be attached to other articles.

Figure 2:
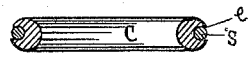
Figure 1:
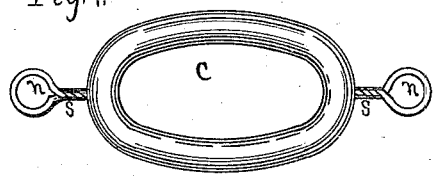
Figure 4:
Figure 3:
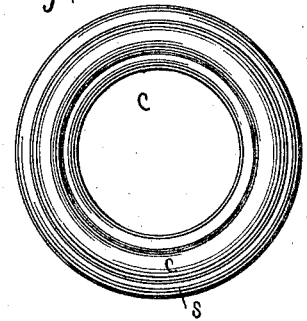
Figure 5:
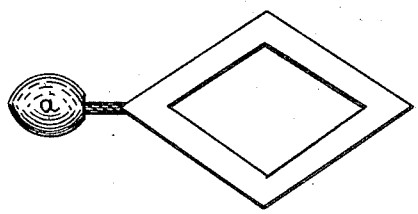

In the drawings forming a part of this specification, Figure 1 represents an oval glass article or link formed with a circumferential groove, in which a cord of twisted wire is placed, formed with a loop, $n$, at each end of the link, by which it may be connected with other similar links to form a chain. Fig. 2 is a cross-section of Fig. 1. Fig. 3 represents a glass ring formed with both inner and outer circumferential grooves, in which are metallic rings. Fig. 4 is a cross-section of Fig. 3. Fig. 5 represents a glass or china article of diamond shape formed with a circumferential groove, in which the wire cord is placed with its ends twisted together and inserted in an ornamental piece, $a$.

Glass ring $c$ is formed with a circumferential groove, $e$, which contains the metallic ring or band $s$. I prefer to make the band $s$ of wire or wire cord, as the ends may easily be twisted together to firmly inclose the ring or other article herein mentioned, and also for convenience in attaching the ring by the cord to other articles when desired.

Rings and other articles of glass or porcelain may be advantageously used, especially on harness, as the weather does not tarnish them, and they are not subject to rust.

I claim as my invention—

1. A ring, loop, or similar article suitable for harness-trimmings, formed of glass or earthenware, with a circumferential groove therein, adapted to receive and retain a supporting-band to be attached to such article, substantially as described.

2. A ring, loop, or similar article suitable for harness-trimmings, formed of glass or earthenware, with a circumferential groove therein, in combination with and containing a metallic band, substantially as described.

3. A ring, loop, or similar article suitable for harness-trimmings, formed of glass or earthenware, with a circumferential groove therein, in combination with a flexible metallic band formed with one or more loops, $n$, substantially as described.

JOHN G. EBERHARD.

Witnesses:
GEO. I. ROBINSON,
BRADFORD HOWLAND.